United States Patent

Rakisits

[11] Patent Number: 6,053,628
[45] Date of Patent: Apr. 25, 2000

[54] DECORATIVE FIBER OPTIC LIGHT SYSTEM

[76] Inventor: Terry L. Rakisits, 40132 Calle Plana St., Green Valley, Calif. 91350

[21] Appl. No.: 09/164,638

[22] Filed: Oct. 1, 1998

[51] Int. Cl.[7] .............................. F21W 121/04; F21V 8/00
[52] U.S. Cl. ......................... 362/568; 362/123; 362/560; 362/580
[58] Field of Search ..................... 362/123, 552, 362/554, 560, 568, 565, 580, 551, 567

[56] References Cited

U.S. PATENT DOCUMENTS

| | | | |
|---|---|---|---|
| 4,060,722 | 11/1977 | Foley | 362/568 |
| 4,858,086 | 8/1989 | Pietrantonio et al. | 362/568 X |
| 5,104,608 | 4/1992 | Pickering | 362/568 |
| 5,226,709 | 7/1993 | Labranche | 362/568 |
| 5,455,750 | 10/1995 | Davis et al. | 362/123 |
| 5,702,170 | 12/1997 | Broderick | 362/568 |
| 5,820,248 | 10/1998 | Ferguson | 362/123 |
| 5,829,863 | 11/1998 | Gutshall | 362/568 X |

*Primary Examiner*—Laura K. Tso

[57] ABSTRACT

A fiber optic light system is provided including a light assembly having a pair of lights adapted to illuminate upon the receipt of power. Also included is a flasher unit connected to the lights for intermittently supplying power to the lights. A plurality of fiber optic strands are provided each including an inboard end mounted on the light assembly. A plurality of modules are each mounted along the strands for emitting light passing through the corresponding strand.

10 Claims, 3 Drawing Sheets

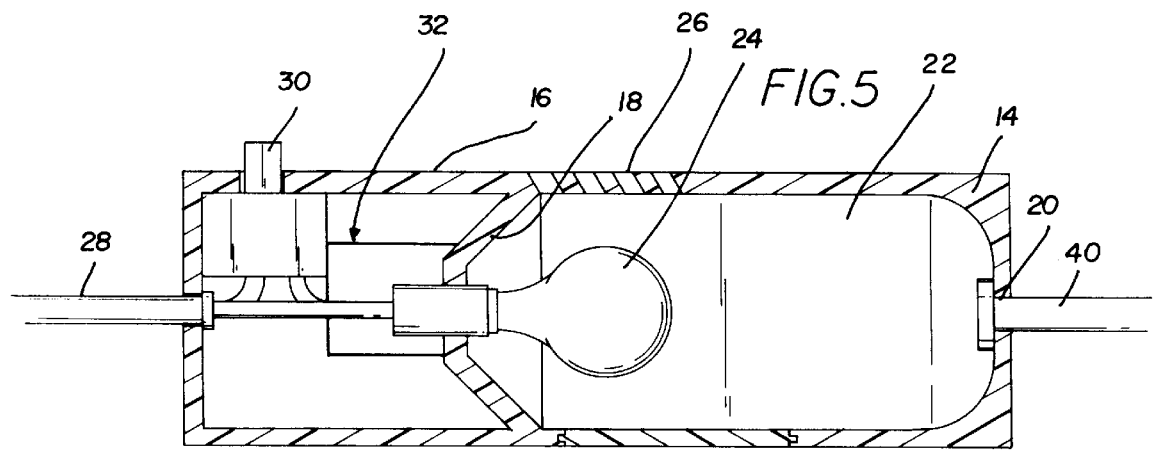
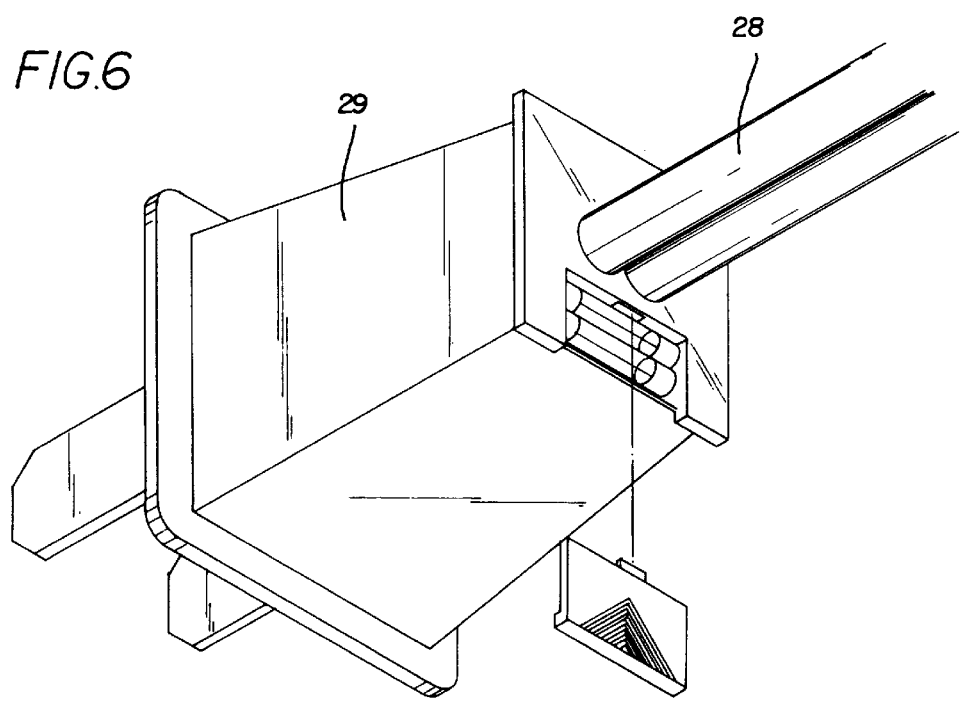

DECORATIVE FIBER OPTIC LIGHT SYSTEM

BACKGROUND OF THE INVENTION

1. Field of the Invention

The present invention relates to decorative lights and more particularly pertains to a new decorative fiber optic light system for decorating various structures in a unique, safe manner.

2. Description of the Prior Art

The use of decorative lights is known in the prior art. More specifically, decorative lights heretofore devised and utilized are known to consist basically of familiar, expected and obvious structural configurations, notwithstanding the myriad of designs encompassed by the crowded prior art which have been developed for the fulfillment of countless objectives and requirements.

Known prior art decorative lights include U.S. Pat. Nos. 4,878,157; 4,858,086; 5,104,608; 4,068,118; 4,777,571; and Des. 326,626 which are each incorporated herein by reference.

In these respects, the decorative fiber optic light system according to the present invention substantially departs from the conventional concepts and designs of the prior art, and in so doing provides an apparatus primarily developed for the purpose of decorating various structures in a unique, safe manner.

SUMMARY OF THE INVENTION

In view of the foregoing disadvantages inherent in the known types of decorative lights now present in the prior art, the present invention provides a new decorative fiber optic light system construction wherein the same can be utilized for decorating various structures in a unique, safe manner.

The general purpose of the present invention, which will be described subsequently in greater detail, is to provide a new decorative fiber optic light system apparatus and method which has many of the advantages of the decorative lights mentioned heretofore and many novel features that result in a new decorative fiber optic light system which is not anticipated, rendered obvious, suggested, or even implied by any of the prior art decorative lights, either alone or in any combination thereof.

To attain this, the present invention generally comprises a light assembly having a housing constructed from a fireproof material. As shown in FIG. 5, the housing is equipped with a rectangular configuration having a top face, a bottom face, and a thin periphery. Such periphery is defined by a pair of elongated side faces and a pair of short end faces formed therebetween for forming an interior space. The light assembly further includes a concave reflector mounted within the interior space of the housing between a central extent of the side faces. As such, a first compartment and a second compartment are defined. Formed in one of the end faces of the housing between the side faces is a plurality of linearly aligned apertures. Further, a divider is situated between the reflector and the end face in which the apertures are formed for defining a pair of laterally oriented subcompartments. As shown in FIG. 5, a pair of lamps are mounted on the reflector on opposite sides of the divider in separate subcompartments for emitting light from the apertures upon the receipt of power. For expelling heat generated by the lamps, a plurality of vents are positioned in the top face of the housing above the lamps. The light assembly further includes a power cord connected to the lamps and extended from one of the end faces with a plug mounted thereon for being releasably received within an alternating current receptacle. Mounted on the top face of the housing is a toggle switch which is connected to the power cord. This toggle switch is adapted for precluding the transmission of power to the lamps in a first orientation. In a second orientation, the transmission of power to the lamps is allowed. With reference now to FIG. 4, the light assembly further includes a flasher control unit connected including a pair of dials each mounted on a side face of the housing and connected to the power cord for intermittently supplying power to each of the lamps at a rate manually controlled by way of one of the dials. Finally, a plurality of fiber optic strands each have an inboard end mounted within one of the apertures of the housing of the light assembly, as shown in FIG. 1. A plurality of termination points are equally spaced along a length of each strand. See FIG. 2. At these termination points, a plurality of bulb modules are positioned. As shown in FIGS. 2 & 3, each bulb module includes a hollow cylinder with a pair of open ends for releasably receiving the associated strand. A sleeve is integrally coupled on a central extent of the cylinder and extends therefrom in perpendicular relationship therewith. A colored translucent light refracting lens in the shape of a bulb is mounted on an end of the sleeve for dispersing light that passes therethrough. Lastly, a reflective surface is situated within the cylinder for directing light passing through the strand into the lens.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new decorative fiber optic light system apparatus and method which has many of the advantages of the decorative lights mentioned heretofore and many novel features that result in a new decorative fiber optic light system which is not anticipated, rendered obvious, suggested, or even implied by any of the prior art decorative lights, either alone or in any combination thereof.

It is another object of the present invention to provide a new decorative fiber optic light system which may be easily and efficiently manufactured and marketed.

It is a further object of the present invention to provide a new decorative fiber optic light system which is of a durable and reliable construction.

An even further object of the present invention is to provide a new decorative fiber optic light system which is susceptible of a low cost of manufacture with regard to both materials and labor, and which accordingly is then susceptible of low prices of sale to the consuming public, thereby making such decorative fiber optic light system economically available to the buying public.

Still yet another object of the present invention is to provide a new decorative fiber optic light system which provides in the apparatuses and methods of the prior art some of the advantages thereof, while simultaneously overcoming some of the disadvantages normally associated therewith.

Still another object of the present invention is to provide a new decorative fiber optic light system for decorating various structures in a unique, safe manner.

Even still another object of the present invention is to provide a new decorative fiber optic light system that includes a light assembly having a pair of lights adapted to illuminate upon the receipt of power. Also included is a flasher unit connected to the lights for intermittently supplying power to the lights. A plurality of fiber optic strands are provided each including an inboard end mounted on the light assembly. A plurality of modules are each mounted along the strands for emitting light passing through the corresponding strand.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side cross-sectional view of the light assembly of the present invention.

FIG. 6 is a detailed perspective view of the plug of the present invention.

DESCRIPTION OF THE PREFERRED EMBODIMENT

Figure 1:
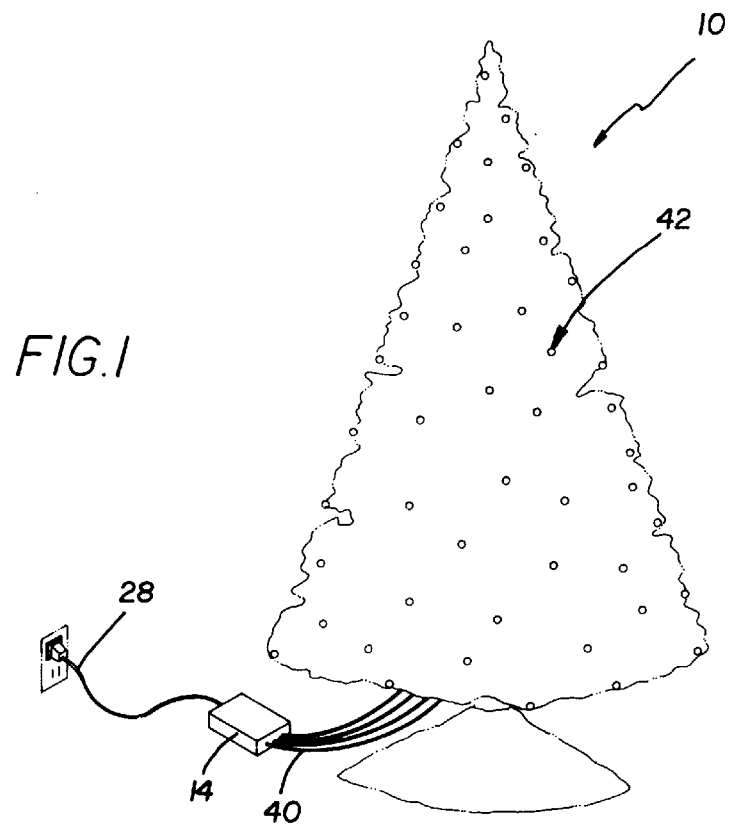
FIG. 1 is a perspective view of a new decorative fiber optic light system according to the present invention.

With reference now to the drawings, and in particular to FIGS. 1 through 6 thereof, a new decorative fiber optic light system embodying the principles and concepts of the present invention and generally designated by the reference numeral 10 will be described.

The present invention is adapted for use with a Christmas tree 12 including a base and an upper portion. Such upper portion is equipped with a plurality of tapering branches which take on an upright frusto-conical configuration. It should be noted that the present invention may also be mounted on a home or any other type of building or structure.

The present invention, designated as numeral 10, includes a light assembly 14 having a housing 16 constructed from a fireproof material. As shown in FIG. 5, the housing is equipped with a rectangular configuration having a top face, a bottom face, and a thin periphery. Such periphery is defined by a pair of elongated side faces and a pair of short end faces formed therebetween for forming an interior space. The light assembly further includes a concave reflector 18 mounted within the interior space between a central extent of the side faces. As such, a first compartment and a second compartment are defined.

Formed in one of the end faces of the housing between the side faces is a plurality of linearly aligned apertures 20. Further, a divider 22 is situated between the reflector and the end face in which the apertures are formed for defining a pair of laterally oriented subcompartments in the first compartment. As shown in FIG. 5, a pair of halogen lamps 24 are mounted on the reflector on opposite sides of the divider in the first compartment and in separate subcompartments for emitting light from the apertures upon the receipt of power. It should be noted that each lamp is adapted to emit light from one half of the apertures. For expelling heat generated by the lamps, a plurality of vents 26 are positioned in the top face of the housing above the lamps.

The light assembly further includes a power cord 28 connected to the lamps and extended from one of the end faces for supplying power to the lamps. To accomplish this, the power cord further has a plug 29 mounted thereon for being releasably received within an alternating current receptacle. As shown in FIG. 6, the plug is preferably equipped with a fuse compartment positioned on a side face opposite the prongs thereof. Such compartment has a removably cover for containing a pair of fuses therein which protect the electrical components of the present invention from surges and the like.

Mounted on the top face of the housing and situated within the second compartment is a toggle switch 30 which is connected to the power cords. This toggle switch is adapted for precluding the transmission of power to the lamps in a first orientation. In a second orientation, the transmission of power to the lamps is allowed. It should be noted that after current is passed through toggle switch, it is spliced to each of the lamps via independent supply lines.

Figure 4:
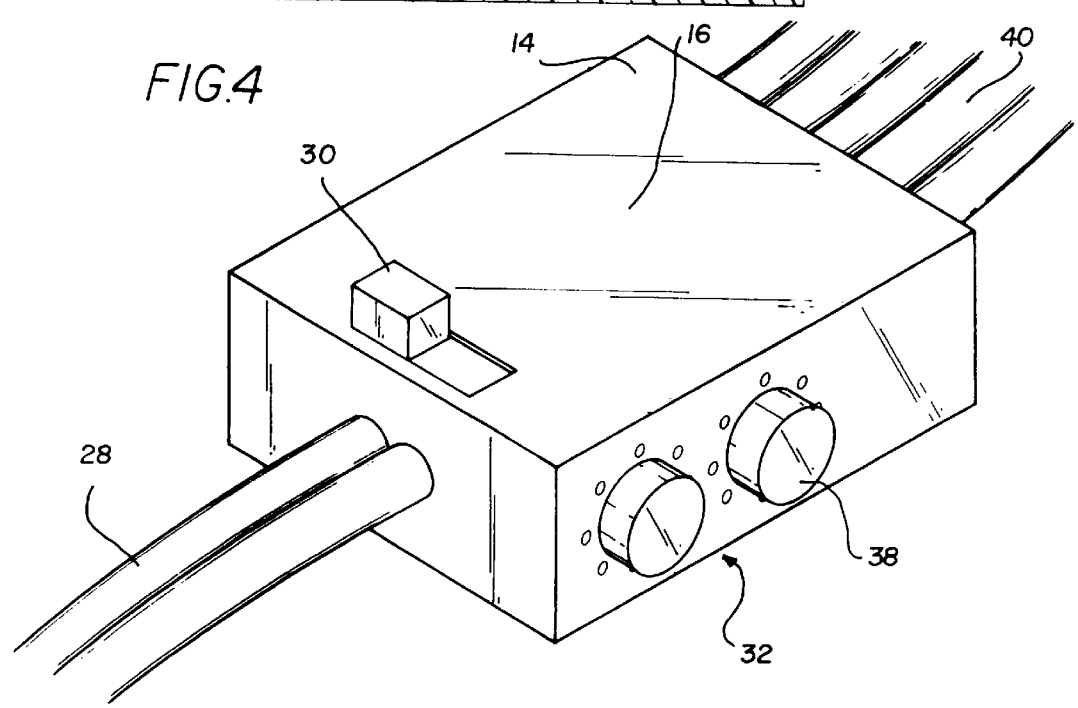
FIG. 4 is a perspective view of the light assembly of the present invention.

With reference now to FIG. 4, a flasher control unit 32 is mounted on the housing of the light assembly. The flasher unit includes a pair of dials 38 each connected to one of the supply lines of the power cord. The flasher unit is thus adapted for intermittently supplying power to the associated lamp at a rate manually controlled by way of one of the dials. As an option, the power is supplied in an alternating fashion when the dials are set at equivalent rates.

Finally, a plurality of fiber optic strands 40 each have an inboard end mounted within one of the apertures of the housing of the light assembly, as shown in FIG. 1. The inboard ends of the fiber optic strands are preferably maintained in place by way of annular flanges. Ideally, the fiber optic strands each has an opaque covering lining its outer surface. A plurality of termination points are equally spaced along a length of each strand. See FIG. 2. A plurality of bulb modules 42 are each positioned at one of these termination points.

Figure 2:
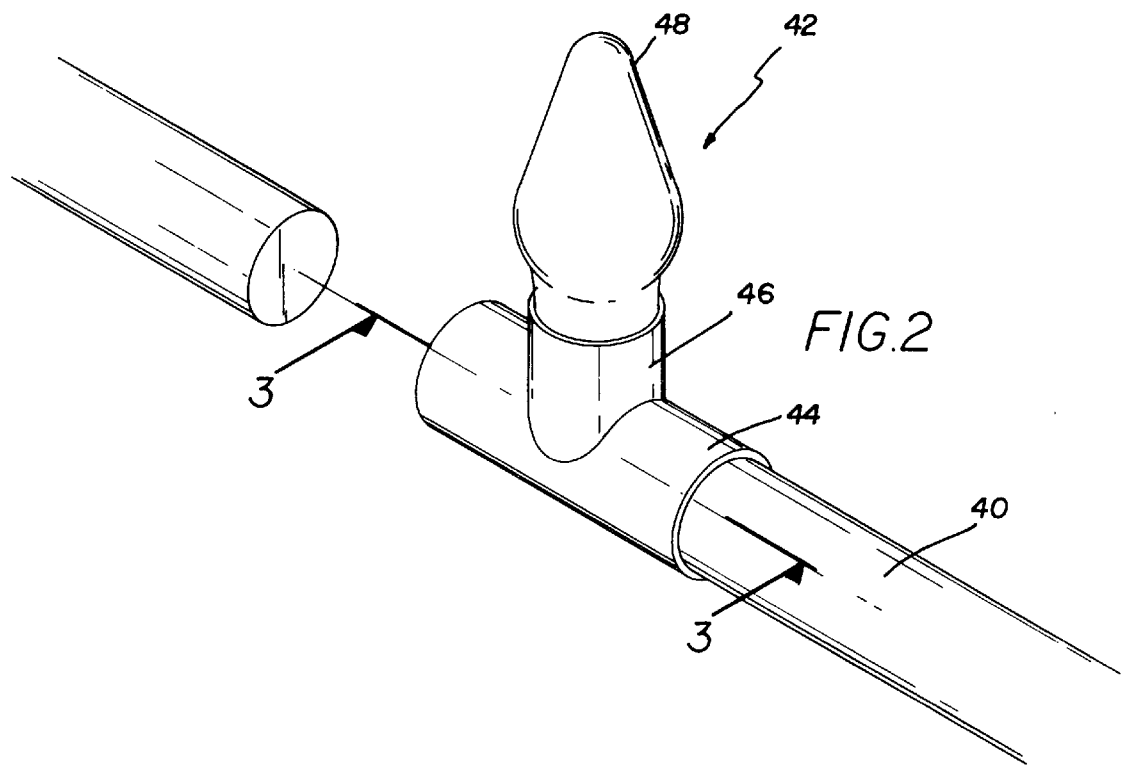
FIG. 2 is an exploded view of one of the strands and bulb modules of the present invention.
Figure 3:
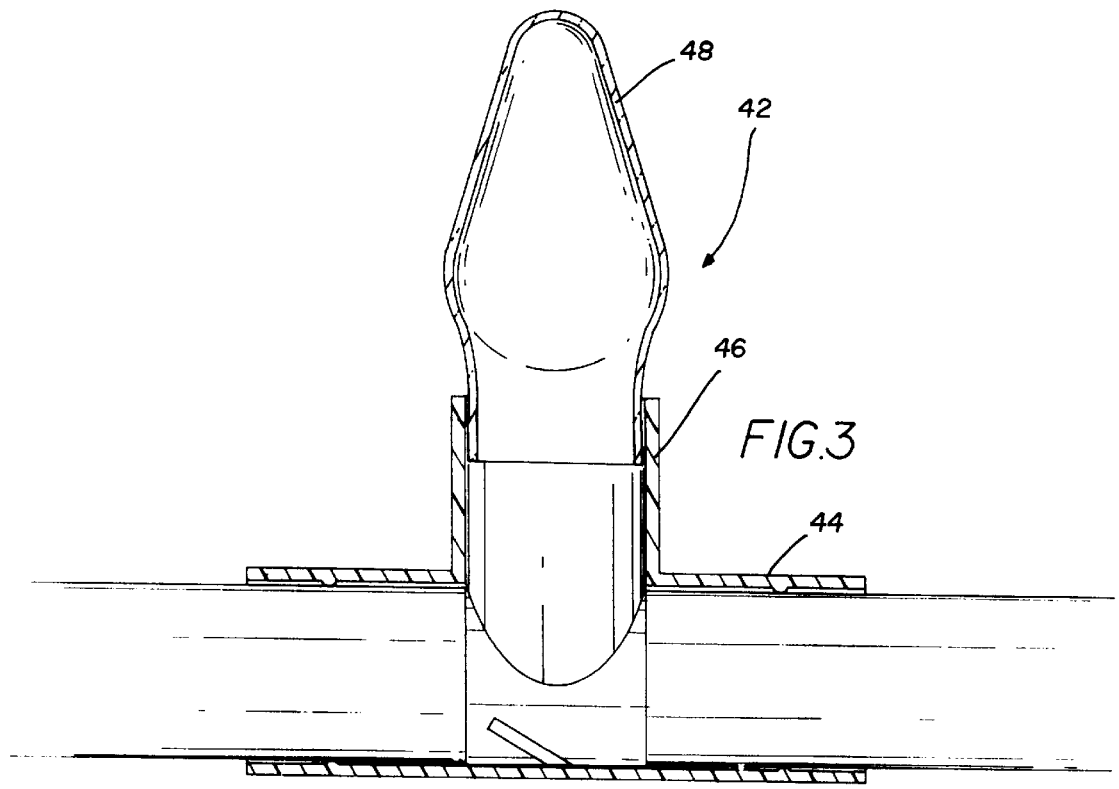
FIG. 3 is a side cross-sectional view of the present invention taken along line 3—3 shown in FIG. 2.

As shown in FIGS. 2 & 3, each bulb module includes a hollow cylinder 44 with a pair of open ends for releasably receiving the associated strand. A sleeve 46 is integrally coupled on a central extent of the cylinder and extends therefrom in perpendicular relationship therewith. A colored translucent light refracting lens 48 in the shape of a bulb is mounted on an end of the sleeve for dispersing light that passes therethrough. Lastly, a reflective surface is situated within the cylinder for directing light passing through the strand into the lens. Note FIG. 3. Such reflective surface may take the form of an angled mirror, lens or the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fiber optic Christmas tree light system comprising, in combination:

a Christmas tree including a base and an upper portion with a plurality of tapering branches which take on an upright frusto-conical configuration;

a light assembly including a housing constructed from a fireproof material with a rectangular configuration having a top face, a bottom face, and a thin periphery defined by a pair of elongated side faces and a pair of short end faces formed therebetween for defining an interior space, the light assembly further including a concave reflector mounted within the interior space of the housing between a central extent of the side faces thereby defining a first compartment and a second compartment, a plurality of linearly aligned apertures formed in one of the end faces between the side faces, a divider mounted between the reflector and the end face in which the apertures are formed for defining a pair of laterally oriented subcompartments, a pair of lamps mounted on the reflector on opposite sides of the divider in separate subcompartments for emitting light from the apertures upon the receipt of power, a plurality of vents formed in the top face of the housing above the lamps for expelling heat generated by the lamps, a power cord connected to the lamps for supplying power to the lamps, and a toggle switch mounted on the top face of the housing and connected to the power cord for precluding the transmission of power to the lamps in a first orientation and further allowing the transmission of power to the lamps in a second orientation;

said light assembly further including a flasher control unit connected with the power cord of the light assembly, the flasher unit including a pair of dials each mounted on a side face of the housing and connected between the power cord for intermittently supplying power to the lamps at a rate manually controlled by way of one of the dials; and a plurality of fiber optic strands situated within the upper portion of the tree, each strand having an inboard end mounted within one of the apertures of the housing of the light assembly and a free outboard end, a plurality of termination points equally spaced along a length of each strand, and a plurality of bulb modules each including a hollow cylinder with a pair of open ends for releasably receiving the associated strand at the termination points, a sleeve mounted on a central extent of the cylinder and extending therefrom in perpendicular relationship therewith, a colored translucent light refracting lens in the shape of a bulb mounted on an end of the sleeve for dispersing light that passes therethrough, and a reflective surface situated within the cylinder for directing light passing through the strand into the lens.

2. A fiber optic light system comprising:

a light assembly including a pair of lights adapted to illuminate upon the receipt of power;

a flasher unit connected to the lights for intermittently supplying power to the lights;

a plurality of fiber optic strands each including an inboard end mounted on the light assembly and a plurality of modules each mounted along the strands for emitting light passing through the corresponding strand; and wherein each module has a light refracting lens.

3. A fiber optic light system as set forth in claim 2 wherein the flasher unit includes a pair of controls for allowing the independent manual governing of a rate at which the flasher units intermittently supply power to the lights.

4. A fiber optic light system as set forth in claim 2 wherein the flasher unit intermittently supplies the lights with power in an alternating manner.

5. A fiber optic light system as set forth in claim 2 wherein each module has a bulb-shaped lens.

6. A fiber optic light system as set forth in claim 2 wherein each module has a lens and a reflective surface for emitting light that is passing through the strand from the lens.

7. A fiber optic light system comprising:

a light assembly including a pair of lights adapted to illuminate upon the receipt of power;

a flasher unit connected to the lights for intermittently supplying power to the lights;

a plurality of fiber optic strands each including an inboard end mounted on the light assembly and a plurality of modules each mounted along the strands for emitting light passing through the corresponding strand; and wherein each module has a lens and a reflective surface for emitting light that is passing through the strand from the lens.

8. A fiber optic light system as set forth in claim 7 wherein the flasher unit includes a pair of controls for allowing the independent manual governing of a rate at which the flasher units intermittently supply power to the lights.

9. A fiber optic light system as set forth in claim 7 wherein the flasher unit intermittently supplies the lights with power in an alternating manner.

10. A fiber optic light system as set forth in claim 7 wherein each module has a bulb-shaped lens.

* * * * *